INVENTOR.
NORMAN H. JASPER
BY
Don D. Doty
ATTORNEY

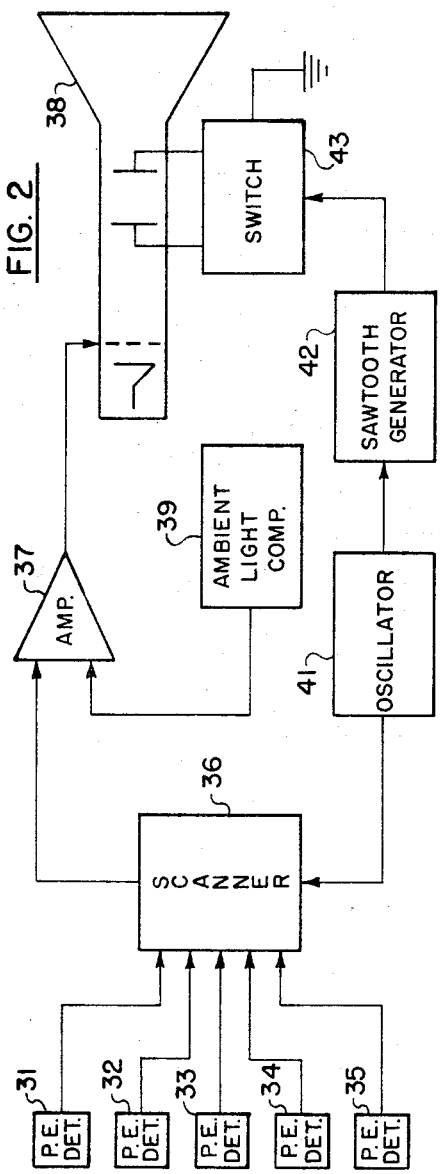
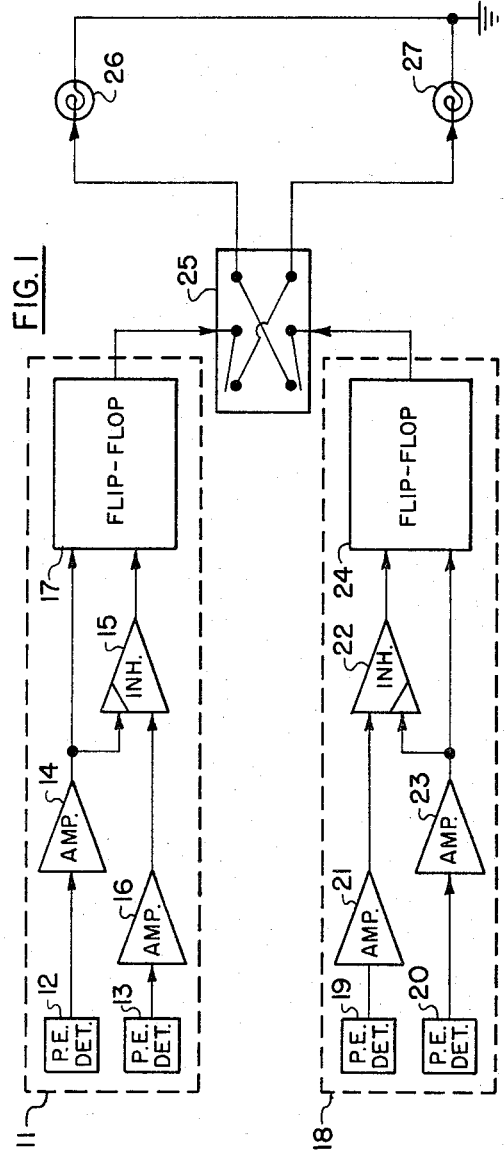

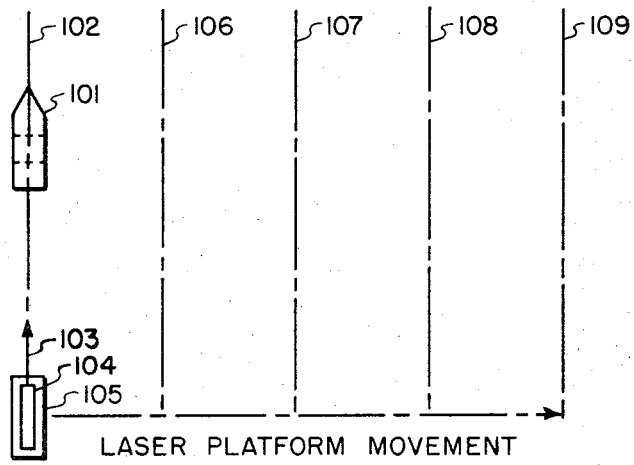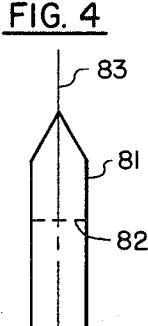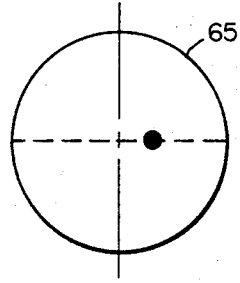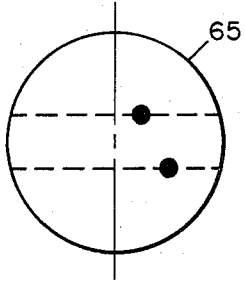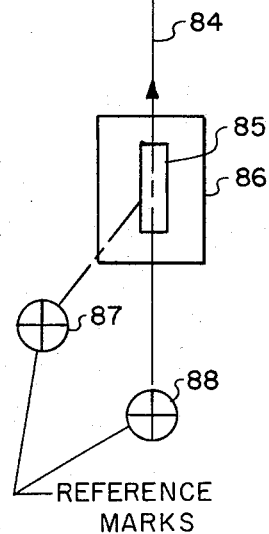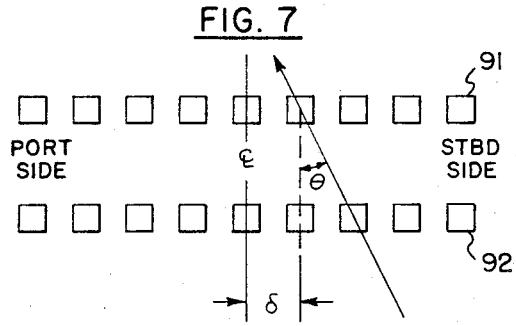

United States Patent Office 3,370,269
Patented Feb. 20, 1968

3,370,269
LASER NAVIGATIONAL AID
Norman H. Jasper, Panama City, Fla., assignor to the United States of America as represented by the Secretary of the Navy
Filed Apr. 20, 1964, Ser. No. 361,620
7 Claims. (Cl. 340—29)

ABSTRACT OF THE DISCLOSURE

A navigation system having a laser which directs its beam down a course intended to be traveled by a vehicle. A sensing and data processing apparatus located on said vehicle senses said laser beam and determines and indicates the direction and distance said vehicle deviates therefrom, as it travels down its intended course.

---

The invention described herein may be manufactured and used by or for the Government of the United States of America for governmental purposes without the payment of any royalties thereon or therefor.

The present invention relates generally to navigation devices and in particular is a system that facilitates navigating a ship along a predetermined course or channel which is referenced and indicated by means of one or more laser beams.

In the past, navigation of ships along a predetermined path has been accomplished, for example, by visually taking "fixes" on one or more markers having known locations, determining a series of instantaneous relative ranges and bearings thereon, plotting the instantaneous earth positions of the ship from said respective relative ranges and bearings as the ship moves along its course, and conning the helmsman accordingly to effect correction of the ship's course, in event it is in error at any given plotting instant. Unfortunately, for many navigational purposes, such procedure provides the helmsman with information that is obsolete or perhaps too late to be of much value; consequently, the safety and operational capabilities of the ship are considerably impaired in general, or at least somewhat jeopardized at that particular time.

Also, under certain circumstances, ship navigation has been satisfactorily accomplished by means of radio, radar, and perhaps even sonar navigation aids in locations where such facilities are available, convenient, and pertinent. Unfortunately, use of such aids are not always practical or possible, as, for instance, may be the case during ship movements through strange, remote waters, mined channels in enemy waters, or the like. In other words, although, as suggested above, such procedures are satisfactory for many practical purposes, they usually require the employment of elaborate, complex, expensive equipment which may not be available or expeditiously used in such naval operations as navigating ships through cleared channels in mine fields or other narrow channel courses, or during mine countermeasure grid-type sweeping and hunting operations.

The present invention overcomes many of the disadvantages inherently existing in the prior art navigation devices, and for many practical purposes and operational circumstances, it effects improved navigation performance not obtainable therefrom. This is ostensively due to the relative simplicity of apparatus involved and the relative ease of operating it with considerably enhanced navigation accuracy.

It is, therefore, an object of this invention to provide an improved navigation system.

Another object of this invention is to provide an improved channel keeping system.

Another object of this invention is to provide an improved method and means for navigating a vehicle along a predetermined course.

Another object of this invention is to provide a laser beam referenced ship navigation system.

Another object of this invention is to provide relatively simple, precise, secure means for guiding ships or other vehicles along prescribed paths.

Still another object of this invention is to provide an improved navigation aid that permits a decrease in clearance channel width requirements for non-countermeasure ships.

A further objective of this invention is to provide a method and means for increasing the accuracy of mine countermeasure grid-type sweeping and hunting operations.

A further object of this invention is to increase the operational capabilities of a ship by effectively reducing the variability and bias of its navigated path.

Another object of this invention is to provide an improved navigation aid which facilitates steering a ship along and within a cleared channel in a mine field.

Still another object of this invention is to provide a relatively simple and inexpensive navigation system that is easily operated.

Another object of this invention is to provide an improved method and means for safely navigating a ship within a narrow predetermined channel.

Another object of this invention is to provide a navigation system that is easily and economically manufactured and maintained.

Other objects and many of the attendant advantages will be readily appreciated as the subject invention becomes better understood by reference to the following detailed description when considered in conjunction with the accompanying drawing wherein:

FIG. 1 is a block diagram representation of a relatively basic embodiment of the laser beam receiving and indicating apparatus of this invention;

FIG. 2 is a block diagram of another embodiment of the laser beam receiving and indicating apparatus incorporated in this invention;

FIG. 4 is a diagrammatical representation of operational procedures and the laser means for effecting them that are incorporated in this invention;

FIG. 5 is a representative view of the display on the face of the cathode ray tube which may occur during use of the embodiment of the subject invention depicted in FIG. 2;

FIG. 6 is a representative view of the display on the face of the cathode ray tube which may occur during use of the embodiment of the subject invention illustrated in FIG. 3;

FIG. 7 is an exemplary diagrammatical view which shows how the subject navigation aid indications may be interpreted for ship navigation purposes;

FIG. 8 illustrates an exemplary representation of how the subject invention may be used during mine countermeasure grid-type sweeping and hunting operations.

Figure 3:
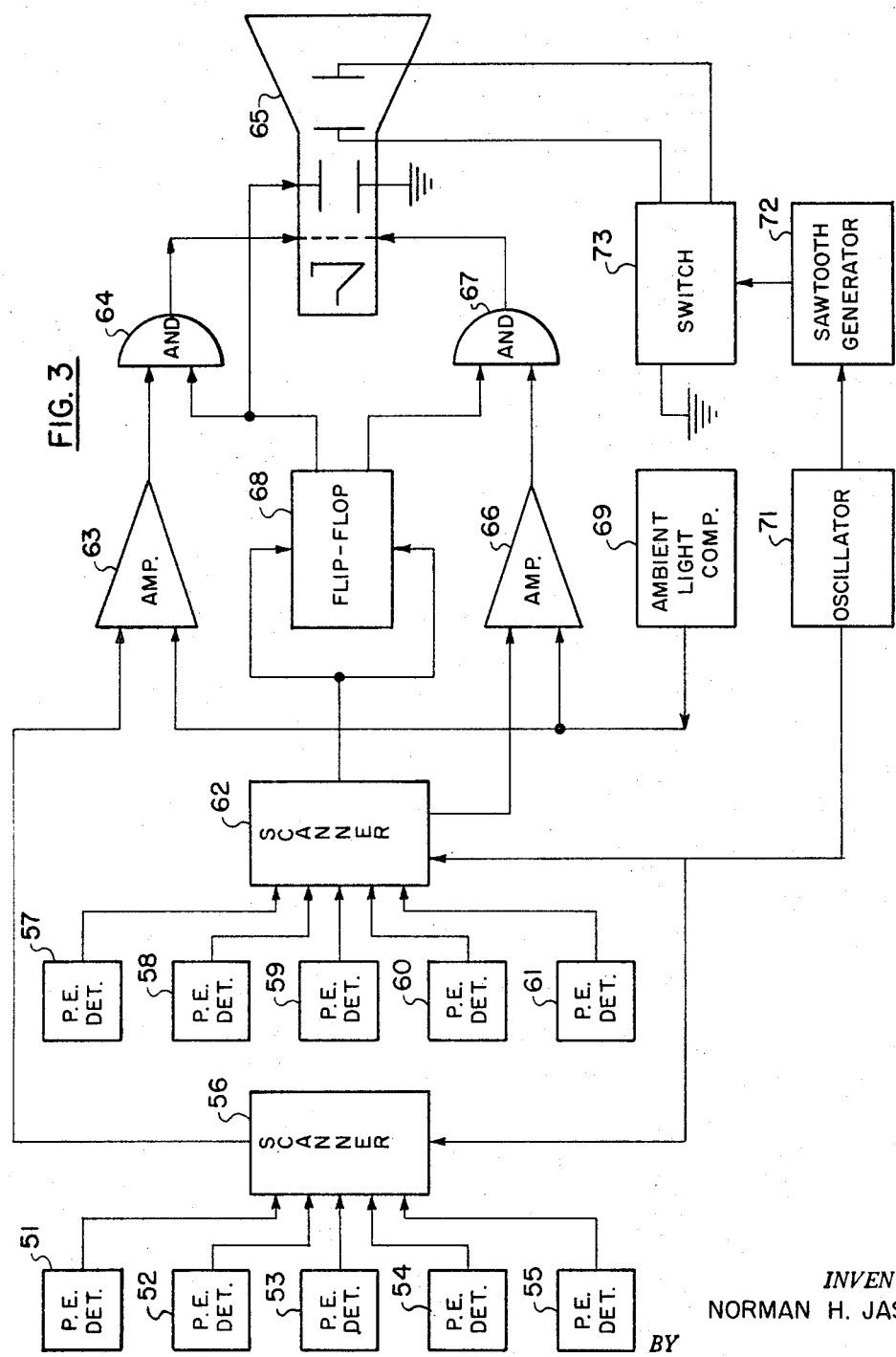
FIG. 3 is a block diagram of still another, more sophisticated embodiment of the laser beam receiving and indicating apparatus of this invention.

Referring now to FIG. 1, there is shown a simplified version of the receiver-indicator portion of the subject invention as having a port side radiant energy beam reception channel 11 which includes a pair of photoelectric detectors 12 and 13 that are sensitive to the collimated light or other collimated energy beam that is transmitted by a preselected energy source such as, for example, a laser or the like. The output of photoelectric detector 12 is coupled through an amplifier 14 to one of the inputs of an inhibit gate 15, and the output of photoelectric detector 13 is coupled through an amplifier 16 to the other input of inhibit gate 15. Inhibit gate 15 is the type of gate which produces an output signal only when an input signal is applied thereto from amplifier 16 and no input signal is applied thereto from amplifier 14. Conventionally speaking, it may comprise for instance, an AND gate with an inverter coupled to an appropriate one of the inputs thereof. The outputs of amplifier 14 and inhibit 15 are respectively applied to a pair of inputs of a bistable multivibrator type of flip-flop 17, the output of which, of course, constitutes the output of channel 11.

A starboard radiant energy beam reception channel 18, which is substantially identical to the aforesaid channel 11, is shown as including another pair of photoelectric detectors 19 and 20, which are comparable to detectors 12 and 13, and which are likewise sensitive to the collimated light or other collimated energy beam that is transmitted by the aforesaid preselected laser or other energy source. The outputs of detectors 19 and 20 are respectively coupled through amplifiers 21 and 23 to the inputs of inhibit gate 22. Inhibit gate 22 is, of course, substantially identical to the aforementioned inhibit gate 15 and, consequently, works in a similar manner. The outputs of inhibit gate 22 and amplifier 23 are respectively applied to a pair of inputs of a bistable multivibrator type of flip-flop 24, the output of which constitutes the output of channel 18.

The outputs of flip-flops 17 and 24 are both connected through a current reversing double-pole-double-throw type receiving switch 25 which, in turn, is connected to a pair of appropriate lights 26 and 27 for timely indication of reception of energy by one or the other of channels 11 and 18 or, in the alternative, for indication of which of channels 11 and 18 has last received energy.

It is, of course, to be understood that photoelectric detectors 12 and 13 are to be physically located at or very near the port side of the ship to be navigated, and that photoelectric detectors 19 and 20 are to be physically located at or near the starboard side of the ship. They should be sensitive to laser beam energy coming from either the front or the back of the ship so that detection thereof will occur regardless of the direction of travel of the ship. The indicator lights 26 and 27, of course, may be suitably located at the bridge or any other place that is convenient for being observed by the helmsman of the ship and/or other individuals having navigation responsibilities therefor.

FIG. 2 illustrates a receiver-indicator having a plurality of photoelectric detectors 31 through 35, each of which has its output coupled to a scanner 36. The output of scanner 36 is fed through a variable gain amplifier 37 to the intensity grid of a cathode ray tube 38. In order to optimize operations, the gain of amplifier 37 is preferably regulated to compensate for a variety of possible light conditions (either natural or man-controlled) by an ambient light compensator 39. An oscillator 41 has its output signal coupled to scanner 36 for controlling the scanning rate thereof and to the input of a sawtooth generator 42 for synchronizing the sawtooth signal generation with the aforesaid scanner scanning operation. The output of sawtooth generator 42 is supplied through a current reversing switch 43 to the horizontal sweep plates of said cathode ray tube 38.

The device of FIG. 3 is somewhat comparable to that of FIG. 2 but has two sets of detectors and associated scanning elements, in order to provide some directional indication as well as presence of received laser or other collimated radiant energy. Thus, there is shown a first plurality of photoelectric detectors 51 through 55, each of which has its output applied to a scanner 56 and a second plurality of photoelectric detectors 57 through 61, each of which has its output coupled to another scanner 62.

The output of scanner 56 is coupled to one of the inputs of a variable gain controlled amplifier 63, which, in turn, has its output connected to one of the inputs of an AND gate 64. The output of AND gate 64 is coupled to the intensity grid of a cathode ray tube 65.

An output of scanner 62 is likewise coupled to a variable gain amplifier 66, which has its output coupled to one of the inputs of an AND gate 67, and the output thereof is also connected to the intensity grid of the aforesaid cathode ray tube 65. Scanner 62 also has an output applied to a flip-flop 68, and the outputs thereof are applied to the other inputs of the aforementioned AND gates 64 and 67, respectively. In addition, one of the outputs of flip-flop 68 is connected to one of the vertical sweep plates of cathode ray tube 65, with the other plate thereof connected to ground.

Like in the device of FIG. 2, an ambient light compensator is preferably coupled to amplifiers 63 and 64 in order to effect proper gain control thereat, regardless of ambient light conditions.

An oscillator 71 has its output connected to scanners 56 and 62 and to a sawtooth generator 72, and the output of sawtooth generator 72 is coupled through a current reversing switch 73 to the horizontal sweep plates of cathode ray tube 65.

In the devices of both FIGS. 2 and 3, the respective sets of photoelectric detectors are depicted as containing five detectors; however, it should be understood that any number may be used which performs the desired functions for any given operational circumstances, since so doing would be well within the purview of one skilled in the art having the benefit of the teachings herewith presented.

Moreover, it should be noteworthy that each of the elements indicated in block form in the subject invention are well known and conventional per se; and that it is their respective interconnections and interactions that produce the subject improved methods and means for aiding in the navigation of a predetermined vessel along a preselected course with considerable facility and accuracy.

Briefly, the operation of the instant invention will be discussed as follows:

Referring to FIG. 4, there is illustrated a ship 81 which in this particular case contains a single set of photoelectric detectors that are intended to be representative of the type and disposition as those shown in the device of FIG. 1. Ship 81 is shown as traveling along a predetermined course 83 which is marked by a reference beam of collimated light 84 or other energy from a collimated energy source such as a laser 85, preferably mounted on a fixed or stabilized platform 86. Said platform may be positioned accurately with respect to a pair of reference buoys 87 and 88 or other convenient known reference marks to insure that the laser beam maintains an accurate alignment with the intended ship course.

If preferred, the laser beam may be oscillated in a vertical plane as it is directed along the center of the intended course, and, in such instances, the ambient light compensation functions are of some importance, as will be explained further and in more detail below.

Once the intended ship course is marked by proper disposition of the laser and proper direction of its energy beam, ship 81 is steered in such manner as to travel down said beam. To facilitate so doing, the ship is provided with detection devices of, for instance, the types shown in FIGS. 1 through 3, which continuously indicate the position of the laser beam relative to the ship.

If, for example, the arrangement of the device of FIG. 1 were employed as the detection system, the operation would be as follows:

The four photoelectric detectors 12, 13, 19, and 20 are positioned athwartship with, for example, detector 12 on the extreme port side and detector 20 on the extreme starboard side. Detectors 13 and 19 are then placed just inboard of detectors 12 and 20, respectively. As long as the beam remains between the athwartship positioned detectors 12 and 20, the ship is on course and lights 26 and 27 remain turned off. But, for example, should the ship move to the right of intended center of course sufficiently for the reference laser beam to impinge on detector 12, a signal would be produced thereby which is amplified to a more useful level by amplifier 14, and this signal passes to flip-flop 17, causing it to assume the set condition (as opposed to an original reset condition) and effect a closed electrical circuit to either indicator light 26 or indicator light 27 for the lighting thereof, depending on which direction the ship is traveling and the associated setting of switch 25. Until such time as the laser beam impinges on detector 12 the pertinent indicator light remains off because inhibit gate 15 causes the respective flip-flop 12 to remain in the reset condition. This is actually due to the fact that energization of photoelectric detector 13, without energization of photoelectric detector 12, is only capable of putting flip-flop 17 into a reset state, and since this condition already exists at this particular time, no flip-flop change of state occurs as the laser beam passes detector 13, during its travel in the outboard direction. As the ship is then maneuvered to the left toward the back-on-course position, the laser beam again contacts detector 13 which produces an electrical signal that is amplified by amplifier 16, and this signal is then applied to inhibit gate 15. With no signal present at inhibit gate 15 from amplifier 14 and with a signal present at the other input of inhibit gate 15 from amplifier 16, the necessary conditions of inhibit gate 15 are met to cause it to produce an output signal which resets flip-flop 17, thereby turning off the appropriate indicator light to let the helmsman know that he is back on course. Should the ship inadvertently deviate to the left of the intended course center, the detectors and associated circuits of channel 18 would function in a manner similar to those of channel 11, mentioned above.

The device of FIG. 2 operates in a somewhat different manner but likewise produces an indication of the ship's position relative to a laser beam. Depending on said ship's position, one of the athwartship aligned detectors 31 through 35 is energized. Scanner 36 timely steps and successively scans said detectors, and since said scanning operation is properly synchronized with the horizontal sweep of cathode ray tube 38, the relative ship position is indicated on the face thereof in such manner as is exemplarily shown in FIG. 5. Of course, in this case, oscillator 41 and sawtooth generator 42 effect the synchronization between the stepping of scanner 36 and the display cathode ray tube 38. Thus, for instance, if the laser beam were impinging on detector 34, due to the fact that the ship was off course slightly to the left, the emission from the grid of cathode ray tube 38 would be intensified at the instant the horizontal sweep is located at a comparable position on the face thereof and a bright spot would appear thereat. The location of the bright spot left or right of a center point or reticle on the face of the cathode ray tube would represent whether the ship being navigated is to the left or right of the desired course. Steering correction by the helmsman would then only be necessary to bring the ship back to the desired course, and this, in this particular example, would be indicated when photoelectric detector 33 is energized by the reference laser beam. As may readily be seen, switch 43, which is comparable to switch 25 as the device of FIG. 2, is set accordingly to the travel direction of the ship relative to the position of the laser beam source, viz, laser 85 and its associated platform 86.

The device of FIG. 3 operates in a manner substantially similar to the device of FIG. 2 except that two sets of detectors are mounted in respective longitudinally disposed alignments athwartship instead of one set of detectors. This, of course, necessitates that a pair of indications be timely presented on the face of cathode ray tube 65 instead of just one. This is accomplished by having scanner 62 timely set and reset flip-flop 68, so that it will timely provide input signals to control the opening and closing of AND gates 64 and 67. Of course, the particular AND gate that has a signal applied to it from flip-flop 68 is the one that is open and passes the scanned signal, if any, on to the cathode ray tube, where it is presented as a bright spot on the face thereof at the horizontal position corresponding to the position of the received laser radiant energy beam. Concomitant with this operation, flip-flop 68 timely and in a properly synchronized manner supplies the proper voltage levels to the vertical positioning plates of cathode ray tube 65 to make the indication levels displayed on the face thereof correspond with the set of photoelectric detectors that are intended to be displayed at any particular instant, as is exemplarily represented in FIG. 6.

Like in the device of FIG. 2, oscillator 71 and sawtooth generator 72 synchronize the stepping of scanners 56 and 62 with the respective horizontal sweep of cathode ray tube 65. Switch 73, of course, is the reversing type (similar to switch 25) which is adjusted in accordance with the direction the navigated ship is traveling.

Inspection of FIG. 7 will disclose that using a pair of sets of photoelectric indicators (represented by a plurality of aligned squares such as squares 91 and 92) not only indicates instantaneous relative positions of ship and laser beam but also discloses the actual direction from which the laser beam is coming. In the representation of FIG. 7, it may be seen that the laser beam is approaching the ship at an angle $\theta$ with respect to the longitudinal axis ₵ thereof, and that said axis is some distance $\delta$ from the nearest pair of starboard fore and aft detectors. With this information obtained from the face of tube 65, as it is displayed by FIG. 6, it becomes a simple matter for the helmsman to determine the ship position error at that time and quickly steer the ship to properly put it back "on the beam" or "on course."

The devices of FIGS. 2 and 3 employ only two sets of five photoelectric detectors positioned athwartship, but it should be understood that any number of sets and/or detectors may be used that will provide the degree of navigation accuracy desired for any given operational circumstance. Hence, FIG. 7 symbolically illustrates, for example, that nine such detectors may be employed if preferred.

FIG. 8 depicts a representation of a somewhat more elaborate use of the subject inventive concept. In this particular case, a predetermined grid pattern is traversed with the help of a guiding laser beam. For example, a ship 101 may be guided down grid path 102 by laser beam 103, emanating from laser 104, mounted on movable platform 105. After making its trip along path 102, the laser may be timely moved to the right so as to guide ship 101 along paths 106 through 109, and others as warranted, to traverse a predetermined grid pattern for mine hunting and countermeasure purposes or other purposes as desired.

If so desired, the concept of FIG. 8 may also be construed as having a plurality of laser beams 102 and 106 through 109 which are used to define the width extremities of a plurality of ship channels, respectively. In such case, a ship might travel, for example, within the channel marked by beams 102 and 106 or perhaps it might travel within the channel marked by beams 107 and 108. Of course, as may readily be seen, for any given single channel that is marked in such manner, only a pair of collimated radiant energy beams are actually required to respectively mark the width extremities thereof. Reversing the positions of detectors 12 and 13 and detectors 19 and 20 in the device of FIG. 1, of course, would effect proper indication of the channel relative to the ship for navigation purposes in this instance.

As suggested above, the laser beam may be oscillated in the vertical plane as it is transmitted along the intended course of a ship. This, of course, will allow use thereof by different ships of different size and configuration or ships having photoelectric detectors disposed at different heights. In such case, the respective ambient amplifiers and light compensators and controllers are employed to determine the length of time a particular ship position indication will remain on after receipt of a laser beam signal, the length of time being related to the oscillation frequency of the laser beam in the vertical plane. This result is effected by the ambient light compensators automatically adjusting the sensitivity of their associated amplifiers in accordance with a predetermined function of the ambient energy level present in the particular detector that is being energized by the laser beam at any given instant.

In the above discussions of the disclosed preferred structural embodiments and their respective operations, a laser was defined as being the reference collimated radiant energy source. This was done because it is opined that a laser is an element of paramount importance in this invention and, thus, makes a very important contribution thereto. It was also done to facilitate disclosure of a preferred embodiment of the subject invention in a relatively simple and clear manner. However, it is to be understood that use of a laser is only one exemplary means for producing an accurately projected collimated light or other energy beam, and that any desired appropriate collimated light source may be employed in a similar manner for similar purposes. Of course, the design choice of the detectors would be contingent on the radiant energy source selected.

Also in most of the foregoing discussion, the use of only one collimated energy beam has been indicated; however, a pair of such beams may be used to define the width extremities of any given predetermined channel and the receiver-indicators used and/or constructed accordingly, since so doing would obviously be well within the purview of one skilled in the art having the benefit of the teachings herewith presented.

Many modifications and other embodiments of the subject invention will readily come to the mind of one skilled in the art having the benefit of the teachings presented in the foregoing description and accompanying drawings, and hence it is to be understood that the invention is not to be limited thereto and that said modifications, etc., are intended to be included within the scope of the appended claims.

What is claimed is:

1. In a laser navigation system,
a first pair of photoelectric detectors adapted for being energized by the radiant energy beam transmitted by a laser,
a second pair of photoelectric detectors adapted for being energized by the radiant energy beam transmitted by a laser,
a first inhibit gate effectively coupled to the outputs of said first pair of photoelectric detectors,
a second inhibit gate effectively coupled to the outputs of said second pair of photoelectric detectors,
a first flip-flop connected to the output of said first inhibit gate and effectively connected to the output of one of said first pair of photoelectric detectors,
a second flip-flop connected to the output of said second inhibit gate and effectively connected to the output of one of the aforesaid second pair of photoelectric detectors, and
a pair of indicator means effectively connected to the outputs of said first and second flip-flops respectively.

2. The device of claim 1 further characterized by a signal reversing switch connected between the outputs of said flip-flops and the inputs of the aforesaid pair of indicator means.

3. In a laser navigation system,
a first plurality of photoelectric detectors responsive to radiant energy transmitted by a laser,
a first scanner connected to the outputs of said first plurality of photoelectric detectors,
a second plurality of photoelectric detectors responsive to radiant energy transmitted by a laser,
a second scanner connected to the outputs of said second plurality of photoelectric detectors,
a first AND gate having a pair of inputs and an output with one of the inputs thereof effectively connected to the output of said first scanner,
a second AND gate having a pair of inputs and an output with one of the inputs thereof connected to the output of said second scanner,
a cathode ray tube having an intensity grid, a pair of vertical sweep plates, and a pair of horizontal sweep plates, with the intensity grid thereof connected to the outputs of said first and second AND gates,
a flip-flop having a pair of interconnected inputs and a pair of outputs with the interconnected pairs of inputs thereof connected to an output of said second scanner and one of said pair of outputs connected to the other input of said first AND gate and one of the vertical sweep plates of said cathode ray tube and the other output thereof connected to the other input of said second AND gate,
a sawtooth generator,
a signal reversing switch interconnecting the output of said sawtooth generator and the aforesaid horizontal sweep plates of said cathode ray tube, and
an oscillator connected to the inputs of each of the aforesaid first and second scanners and sawtooth generator for the synchronous stepping and driving thereof respectively.

4. The invention according to claim 3 further characterized by,
a first controllable gain amplifier interconnecting the output of said first scanner and one of the inputs of said first AND gate,
a second controllable gain amplifier interconnecting the output of said second scanner and one of the inputs of said second AND gate, and
means connected to said first and second amplifiers for controlling the respective gains thereof in accordance with predetermined ambient radiant energy conditions.

5. A method of navigating a marine vehicle along a predetermined course comprising the steps of,
disposing and position stabilizing a laser at one extremity of a predetermined course intended to be navigated by a marine vehicle,
directing the energy beam of said laser along the center of said predetermined course,
sensing the position of said laser beam as said vehicle travels substantially along said predetermined course,
determining and indicating the distance and direction said vehicle has deviated from said laser beam as said vehicle travels substantially along said predetermined course,
steering said vehicle in such manner as to substantially eliminate any distance said vehicle deviates from said laser energy beam as said distance is determined and indicated.

6. In a laser navigation system,
a plurality of aligned photoelectric detectors adapted for being energized by the radiant energy beam from a laser,
a scanner coupled to the output of each of said photoelectric detectors,
a cathode ray tube having a pair of horizontal sweep plates and an intensity grid with the intensity grid thereof effectively connected to the output of said scanner,
a sawtooth generator,
a signal reversing switch connected between the output of said sawtooth generator and the horizontal sweep plates of said cathode ray tube, and
an oscillator connected to said sawtooth generator and the aforesaid scanner for driving each thereof in a predetermined synchronized manner.

7. The device of claim 6 further characterized by,
an amplifier having a pair of inputs and an output with one of the inputs thereof coupled to the output of said scanner and the output thereof connected to the intensity grid of said cathode ray tube, and an ambient radiant energy compensator connected to the other input of said implifier for controlling the gain thereof.

References Cited

UNITED STATES PATENTS

| | | | |
|---|---|---|---|
| 2,039,812 | 5/1936 | Lieb | 340—26 |
| 2,489,222 | 11/1949 | Herbold | 340—26 |
| 2,549,860 | 5/1951 | Swanson | 340—26 |
| 2,924,768 | 2/1960 | Ferrand | 250—203 |
| 2,929,922 | 3/1960 | Schawlow | 250—7 |
| 3,000,121 | 9/1961 | Martin | 250—233 |
| 3,087,986 | 4/1963 | DeBrosse | 250—203 X |
| 3,106,642 | 10/1963 | Shapiro | 250—203 X |
| 3,117,176 | 1/1964 | Marks | 340—26 |

OTHER REFERENCES

Laser Control Guides Tunneling Machine. In Laser Focus, vol. 2, No. 7, dated Apr. 1, 1966 (copy in Group 260), p. 7.

JOHN W. CALDWELL, *Primary Examiner.*

CHESTER L. JUSTUS, THOMAS B. HABECKER,
*Examiners.*

G. M. FISHER, A. H. WARING, *Assistant Examiners.*